United States Patent
Wang et al.

(10) Patent No.: US 10,873,733 B2
(45) Date of Patent: Dec. 22, 2020

(54) METHODS AND APPARATUS FOR DERIVING COMPOSITE TRACKS

(71) Applicant: MediaTek Inc., Hsin-Chu (TW)

(72) Inventors: Xin Wang, San Jose, CA (US); Lulin Chen, San Jose, CA (US); Shuai Zhao, San Jose, CA (US)

(73) Assignee: MediaTek Inc., Hsin-Chu (TW)

( * ) Notice: Subject to any disclaimer, the term of this patent is extended or adjusted under 35 U.S.C. 154(b) by 0 days.

(21) Appl. No.: 16/014,817

(22) Filed: Jun. 21, 2018

(65) Prior Publication Data

US 2018/0376125 A1 Dec. 27, 2018

Related U.S. Application Data

(60) Provisional application No. 62/523,873, filed on Jun. 23, 2017.

(51) Int. Cl.
*H04N 13/00* (2018.01)
*H04N 13/111* (2018.01)
(Continued)

(52) U.S. Cl.
CPC ......... *H04N 13/111* (2018.05); *H04N 13/156* (2018.05); *H04N 13/161* (2018.05);
(Continued)

(58) Field of Classification Search
USPC .......... 348/42, 47, 48, 51, 61; 386/326, 335, 386/239
See application file for complete search history.

(56) References Cited

U.S. PATENT DOCUMENTS

2011/0069153 A1* 3/2011 Nakane ............... H04N 19/597
348/43
2011/0242279 A1 10/2011 Redert et al.
(Continued)

FOREIGN PATENT DOCUMENTS

CN 101616322 A 12/2009
CN 102246529 A 11/2011

OTHER PUBLICATIONS

International Search Report and Written Opinion dated Sep. 26, 2018 in connection with International Application No. PCT/CN2018/092446.
(Continued)

*Primary Examiner* — Daquan Zhao
(74) *Attorney, Agent, or Firm* — Wolf, Greenfield & Sacks, P.C.

(57) ABSTRACT

The techniques described herein relate to methods, apparatus, and computer readable media configured to process (including encoding and decoding) composition layouts. The video data includes a plurality of encoded two-dimensional sub-picture tracks associated with a viewport and a composition operation to compose the tracks. The composition operation comprises data indicative of a composition to perform on the plurality of two-dimensional sub-picture tracks to compose the tracks into a canvas associated with the viewport, and a composition layout operation to adjust the composition if the canvas comprises a composition layout created by two or more of the plurality of two-dimensional sub-picture tracks composed on the canvas. The plurality of two-dimensional tracks are composed into the canvas according to the composition, comprising determining two or more of the composed two-dimensional sub-picture tracks comprise the composition layout, and adjusting the composition based on the composition layout operation to compensate for the composition layout.

20 Claims, 11 Drawing Sheets

(51) Int. Cl.
*H04N 13/161* (2018.01)
*H04N 13/156* (2018.01)
*H04N 13/178* (2018.01)
*H04N 19/00* (2014.01)
H04N 9/47 (2006.01)
H04N 19/39 (2014.01)
H04N 19/597 (2014.01)

(52) U.S. Cl.
CPC ........... *H04N 13/178* (2018.05); *H04N 19/00* (2013.01); *H04N 19/39* (2014.11); *H04N 19/597* (2014.11)

(56) References Cited

U.S. PATENT DOCUMENTS

| | | | |
|---|---|---|---|
| 2016/0088287 A1 | 3/2016 | Sadi et al. | |
| 2017/0032553 A1* | 2/2017 | O'Donovan | G06N 7/005 |
| 2018/0376152 A1 | 12/2018 | Wang et al. | |

OTHER PUBLICATIONS

International Preliminary Report on Patentability for International Application No. PCT/CN2018/092446 dated Jan. 1, 2020.
[No Author Listed], Information technology—MPEG systems technologies—Part 10: Carriage of timed metadata metrics of media in ISO base media file format / Amd 1 Carriage of spatial information. ISO/IEC 23001-10:2015/FDAM 1:2016(E), ISO/IEC JTC1/SC29/WG11 N16191. Jun. 6, 2016:8 pages.
Wang et al., Deriving Composite Tracks in ISOBMFF. International Organisation for Standardisation, Coding of Moving Pictures and Audio, ISO/IEC JTC1/SC29/WG11 MPEG2016/M39971. Jan. 2017:9 pages.
U.S. Appl. No. 16/014,856, filed Jun. 21, 2018, Wang et al.
PCT/CN2018/092446, dated Jan. 2, 2020, International Preliminary Report on Patentability.
PCT/CN2018/092446, dated Sep. 26, 2018, International Search Report and Written Opinion.

\* cited by examiner

| Value | Compositing mode | Description |
|---|---|---|
| | | 400 |
| 1 | Clear | No regions are enabled. |
| 2 | Source | Only the source will be present. |
| 3 | Destination | Only the destination will be present. |
| 4 | Source Over | Source is placed over the destination. |
| 5 | Destination Over | Destination is placed over the source. |
| 6 | Source In | Source that overlaps the destination, replaces the destination. |
| 7 | Destination In | Destination which overlaps the source, replaces the source. |
| 8 | Source Out | Source is placed, where it falls outside of the destination. |
| 9 | Destination Out | Destination is placed, where it falls outside of the source. |
| 10 | Source Atop | Source which overlaps the destination, replaces the destination. Destination is placed elsewhere. |
| 11 | Destination Atop | Destination which overlaps the source replaces the source. Source is placed elsewhere. |
| 12 | XOR | The non-overlapping regions of source and destination are combined. |
| 13 ~16 | Reserved | |
| 17 | Dissolve | Takes random pixels from both layers. With high opacity, most pixels are taken from the source layer. With low opacity most pixels are taken from the destination layer. |

FIG. 4A

| Value | Compositing mode | Description |
|---|---|---|
| | | 400 |
| 18 | Plus | Display the sum of the source image and destination image. |
| 19 | Multiply | The source color is multiplied by the destination color and replaces the destination. |
| 20 | Screen | The values of the pixels in the two layers are inverted, multiplied, and then inverted again |
| 21 | Overlay | Overlay combines Multiply and Screen blend modes. |
| 22 | Darken | Selects the darker of the destination and source colors. |
| 23 | Lighten | Selects the lighter of the destination and source colors |
| 24 | Color_dodge | Brightens the destination color to reflect the source color |
| 25 | Color_burn | Darkens the destination color to reflect the source color |
| 26 | Hard_light | Multiplies or screens the colors, depending on the source color value. |
| 27 | Soft_light | Darkens or lightens the colors, depending on the source color value. |
| 28 | Difference | Subtracts the darker of the two constituent colors from the lighter color |
| 29 | Exclusion | Produces an effect similar to that of the Difference mode but lower in contrast. |
| 30 ~ 255 | Reserved | For new modes or non-separable blending modes. |

FIG. 4B

```
aligned(8) class TrackOverlayComposition      ← 502
    extends TransformProperty ('tocp') {  ← 504
    unsigned int(4) version = 0;  ← 506
    unsigned int(4) flags;  ← 508
    unsigned int(7) background_flag;  ← 520
    unsigned int(1) blending_flag;
    if ((background_flag & 1) == 1) // background color
        for (j=0; j<4; j++)
            unsigned int(16) canvas_fill_value;  ← 522
    if ((background_flag & 2) == 2) // background image
        unsigned int(16) image_item_ID;  ← 524
    if ((background_flag & 3) == 1) // background video
        unsigned int(16) video_track_ID;  ← 526
    if (blending_flag == 1) {
        unsigned int(8) alpha_blending_mode;  ← 530
        unsigned int(8) blending_mode_specific_params[] = 0;  ← 532
    }
    FieldLength = ((flags & 1) + 1) * 16;
    unsigned int(FieldLength) output_width;  ← 510
    unsigned int(FieldLength) output_height;  ← 512
    for (i=0; i< num_inputs; i++) {  ← 534
        signed int(FieldLength) horizontal_offset;  ← 514
        signed int(FieldLength) vertical_offset;  ← 516
    }
}
```

518 ↗ (box around inner block)
528 → unsigned int(7) background_flag;
500 → (overall figure)

FIG. 5

```
aligned(8) class TrackGridComposition
extends TransformProperty ('tgcp') {
    unsigned int(4) version = 0;
    unsigned int(4) flags;
    unsigned int(7) background_flag;
    unsigned int(1) blending_flag;
    if ((background_flag & 1) == 1) // background color
        for (j=0; j<4; j++)
            unsigned int(16) canvas_fill_value;
    if ((background_flag & 2) == 2) // background image
        unsigned int(16) image_item_ID;
    if ((background_flag & 3) == 1) // background video
        unsigned int(16) video_track_ID;
    if (blending_flag == 1) {
        unsigned int(8) alpha_blending_mode;
        unsigned int(8) blending_mode_specific_params[] = 0;
    }
    FieldLength = ((flags & 1) + 1) * 16;
    unsigned int(8) rows_minus_one;
    unsigned int(8) columns_minus_one;
    unsigned int(FieldLength) output_width;
    unsigned int(FieldLength) output_height;
    signed int(FieldLength) horizontal_offset = 0;
    signed int(FieldLength) vertical_offset = 0; }
```

```
aligned(8) class TrackMatrixComposition extends TransformProperty ('tmcp') {
    unsigned int(4) version = 0;
    unsigned int(4) flags;
    unsigned int(6) background_flag;
    unsigned int(1) blending_flag;
    unsigned int(1) matrix_flag;
    if ((background_flag & 1) == 1) // background color
        for (j=0; j<4; j++) unsigned int(16) canvas_fill_value;
    if ((background_flag & 2) == 2) // background image
        unsigned int(16) image_item_ID;
    if ((background_flag & 3) == 1) // background video
        unsigned int(16) video_track_ID;
    if (blending_flag == 1) {
        unsigned int(8) alpha_blending_mode;
        unsigned int(8) blending_mode_specific_params[] = 0;
    }
    FieldLength = ((flags & 1) + 1) * 16;
    unsigned int(FieldLength) output_width;
    unsigned int(FieldLength) output_height;
    if (matrix_flag == 1) {
        for (i=0; i< num_inputs; i++) {     matrix=
            template int(32)[9]
            { 0x00010000,0,0,0,0x00010000,0,0,0,0x40000000 }; // unity matrix
            unsigned int(FieldLength) width;
            unsigned int(FieldLength) height; } } }
```

$(p\ q\ 1) * \begin{vmatrix} a & b & u \\ c & d & v \\ x & y & w \end{vmatrix} = (m\ n\ z)$

750

$m = ap + cq + x;\ n = bp + dq + y;\ z = up + vq + w;$ $p' = m/z;\ q' = n/z$

METHODS AND APPARATUS FOR DERIVING COMPOSITE TRACKS

RELATED APPLICATIONS

This Application claims priority under 35 U.S.C. § 119(e) to U.S. Provisional Application Ser. No. 62/523,873 filed Jun. 23, 2017, which is herein incorporated by reference in its entirety.

This case was filed on the same day as application Ser. No. 16/014,856, entitled "METHODS AND APPARATUS FOR DERIVING COMPOSITE TRACKS WITH TRACK GROUPING, " which is hereby incorporated by reference herein in its entirety.

TECHNICAL FIELD

The techniques described herein relate generally to video coding, and particularly to deriving composite tracks.

BACKGROUND OF INVENTION

Various types of 3D content and multi-directional content exist. For example, omnidirectional video is a type of video that is captured using a set of cameras, as opposed to just a single camera as done with traditional unidirectional video. For example, cameras can be placed around a particular center point, so that each camera captures a portion of video on a spherical coverage of the scene to capture 360-degree video. Video from multiple cameras can be stitched, possibly rotated, and projected to generate a projected two-dimensional picture representing the spherical content. For example, an equal rectangular projection can be used to put the spherical map into a two-dimensional image. This can be further processed, for example, using two-dimensional encoding and compression techniques. Ultimately, the encoded and compressed content is stored and delivered using a desired delivery mechanism (e.g., thumb drive, digital video disk (DVD), file download, digital broadcast, and/or online streaming). Such video can be used for virtual reality (VR) and/or 3D video.

At the client side, when the client processes the content, a video decoder decodes the encoded and compressed video and performs a reverse-projection to put the content back onto the sphere. A user can then view the rendered content, such as using a head-mounted viewing device. The content is often rendered according to a user's viewport, which represents an angle at which the user is looking at the content. The viewport may also include a component that represents the viewing area, which can describe how large, and in what shape, the area is that is being viewed by the viewer at the particular angle.

When the video processing is not done in a viewport-dependent manner, such that the video encoder and/or decoder do not know what the user will actually view, then the whole encoding, delivery and decoding process will process the entire spherical content. This can allow, for example, the user to view the content at any particular viewport and/or area, since all of the spherical content is encoded, delivered and decoded.

However, processing all of the spherical content can be compute intensive and can consume significant bandwidth. For example, for online streaming applications, processing all of the spherical content can place a larger burden on network bandwidth than necessarily needed. Therefore, it can be difficult to preserve a user's experience when bandwidth resources and/or compute resources are limited. Some techniques only process the content being viewed by the user. For example, if the user is viewing a top area (e.g., the north pole), then there is no need to deliver the bottom part of the content (e.g., the south pole). If the user changes viewports, then the content can be delivered accordingly for the new viewport. As another example, for free viewpoint TV (FTV) applications (e.g., which capture video of a scene using a plurality of cameras), the content can be delivered depending at which angle the user is viewing the scene. For example, if the user is viewing the content from one viewport (e.g., camera and/or neighboring cameras), there is probably no need to deliver content for other viewports.

SUMMARY OF INVENTION

In accordance with the disclosed subject matter, apparatus, systems, and methods are provided for deriving composite tracks.

Some embodiments relate to an encoding method for encoding a composition operation for a plurality of sub-picture tracks. The method includes encoding three-dimensional video data, comprising encoding into a plurality of two-dimensional sub-picture tracks associated with a viewport, encoding a composition operation for composing the plurality of two-dimensional sub-picture tracks for the viewport, wherein the composition operation comprises data indicative of a composition to perform on the plurality of two-dimensional sub-picture tracks to compose the plurality of two-dimensional tracks into a canvas associated with the viewport and a composition layout operation to adjust the composition if the canvas comprises a composition layout created by two or more of the plurality of two-dimensional sub-picture tracks composed on the canvas, and providing the encoded three-dimensional video data and the composition operation.

In some examples, the composition layout comprises a gap between the two or more of the plurality of two-dimensional sub-picture tracks composed on the canvas, an overlap of the two or more of the plurality of two-dimensional sub-picture tracks composed on the canvas, or both.

In some examples, encoding the composition layout operation of the composition operation comprises encoding one or more of a background color, a background image, or a background video to use to fill a gap between the two or more of the plurality of two-dimensional sub-picture tracks composed on the canvas.

In some examples, encoding the composition layout operation of the composition operation comprises encoding blending data to use to blend an overlap of the two or more of the plurality of two-dimensional sub-picture tracks composed on the canvas. In some examples, encoding the composition of the composition operation comprises selecting the composition from the group consisting of a track overlay composition specifying an overlay operation and an order for overlaying each of the plurality of two-dimensional sub-picture tracks on the canvas; a track grid composition specifying a grid order for overlaying each of the plurality of two-dimensional sub-picture tracks on the canvas; and a track matrix composition specifying an order and a matrix used to overlay each of the plurality of two-dimensional sub-picture tracks on the canvas.

Some embodiments relate to a decoding method for decoding video data. The method includes receiving (a) a plurality of encoded two-dimensional sub-picture tracks associated with a viewport and (b) a composition operation to compose the plurality of two-dimensional sub-picture tracks for the viewport, wherein the composition operation comprises data indicative of a composition to perform on the plurality of two-dimensional sub-picture tracks to compose the plurality of two-dimensional tracks into a canvas associated with the viewport; and a composition layout operation to adjust the composition if the canvas comprises a composition layout created by two or more of the plurality of two-dimensional sub-picture tracks composed on the canvas. The method includes composing the plurality of two-dimensional tracks into the canvas according to the composition, comprising determining two or more of the composed two-dimensional sub-picture tracks comprise the composition layout; and adjusting the composition based on the composition layout operation to compensate for the composition layout.

In some examples, the composition layout comprises a gap between the two or more of the plurality of two-dimensional sub-picture tracks composed on the canvas, an overlap of the two or more of the plurality of two-dimensional sub-picture tracks composed on the canvas, or both.

In some examples, decoding the composition layout operation of the composition operation comprises decoding one or more of a background color, a background image, or a background video and composing the plurality of two-dimensional track comprises filling a gap between the two or more of the plurality of two-dimensional sub-picture tracks composed on the canvas.

In some examples, decoding the composition layout operation of the composition operation comprises decoding blending data; and composing the plurality of two-dimensional track comprises blending an overlap of the two or more of the plurality of two-dimensional sub-picture tracks composed on the canvas.

In some examples, decoding the composition of the composition operation comprises decoding the composition from the group consisting of a track overlay composition specifying an overlay operation and an order for overlaying each of the plurality of two-dimensional sub-picture tracks on the canvas; a track grid composition specifying a grid order for overlaying each of the plurality of two-dimensional sub-picture tracks on the canvas; and a track matrix composition specifying an order and a matrix used to overlay each of the plurality of two-dimensional sub-picture tracks on the canvas.

Some embodiments relate to an apparatus configured to decode video data. The apparatus includes a processor in communication with memory, the processor being configured to execute instructions stored in the memory that cause the processor to receive (a) a plurality of encoded two-dimensional sub-picture tracks associated with a viewport and (b) a composition operation to compose the plurality of two-dimensional sub-picture tracks for the viewport, wherein the composition operation comprises data indicative of a composition to perform on the plurality of two-dimensional sub-picture tracks to compose the plurality of two-dimensional tracks into a canvas associated with the viewport; and a composition layout operation to adjust the composition if the canvas comprises a composition layout created by two or more of the plurality of two-dimensional sub-picture tracks composed on the canvas. The instructions cause the processor to compose the plurality of two-dimensional tracks into the canvas according to the composition, including determining two or more of the composed two-dimensional sub-picture tracks comprise the composition layout and adjusting the composition based on the composition layout operation to compensate for the composition layout.

In some examples, the composition layout comprises a gap between the two or more of the plurality of two-dimensional sub-picture tracks composed on the canvas, an overlap of the two or more of the plurality of two-dimensional sub-picture tracks composed on the canvas, or both.

In some examples, decoding the composition layout operation of the composition operation comprises decoding one or more of a background color, a background image, or a background video; and composing the plurality of two-dimensional track comprises filling a gap between the two or more of the plurality of two-dimensional sub-picture tracks composed on the canvas.

In some examples, decoding the composition layout operation of the composition operation comprises decoding blending data; and composing the plurality of two-dimensional track comprises blending an overlap of the two or more of the plurality of two-dimensional sub-picture tracks composed on the canvas.

In some examples, decoding the composition of the composition operation comprises decoding the composition from the group consisting of: a track overlay composition specifying an overlay operation and an order for overlaying each of the plurality of two-dimensional sub-picture tracks on the canvas; a track grid composition specifying a grid order for overlaying each of the plurality of two-dimensional sub-picture tracks on the canvas; and a track matrix composition specifying an order and a matrix used to overlay each of the plurality of two-dimensional sub-picture tracks on the canvas.

Some embodiments relate to an apparatus for encoding video data. The apparatus includes a processor in communication with memory, the processor being configured to execute instructions stored in the memory that cause the processor to encode three-dimensional video data, comprising encoding into a plurality of two-dimensional sub-picture tracks associated with a viewport, encode a composition operation for composing the plurality of two-dimensional sub-picture tracks for the viewport, wherein the composition operation comprises data indicative of a composition to perform on the plurality of two-dimensional sub-picture tracks to compose the plurality of two-dimensional tracks into a canvas associated with the viewport, and a composition layout operation to adjust the composition if the canvas comprises a composition layout created by two or more of the plurality of two-dimensional sub-picture tracks composed on the canvas, and provide the encoded three-dimensional video data and the composition operation to a receiving device.

In some examples, the composition layout comprises a gap between the two or more of the plurality of two-dimensional sub-picture tracks composed on the canvas, an overlap of the two or more of the plurality of two-dimensional sub-picture tracks composed on the canvas, or both.

In some examples, encoding the composition layout operation of the composition operation comprises encoding one or more of a background color, a background image, or a background video to use to fill a gap between the two or more of the plurality of two-dimensional sub-picture tracks composed on the canvas.

In some examples, encoding the composition layout operation of the composition operation comprises encoding blending data to use to blend an overlap of the two or more of the plurality of two-dimensional sub-picture tracks composed on the canvas.

In some examples, encoding the composition of the composition operation comprises selecting the composition from the group consisting of: a track overlay composition specifying an overlay operation and an order for overlaying each of the plurality of two-dimensional sub-picture tracks on the canvas; a track grid composition specifying a grid order for overlaying each of the plurality of two-dimensional sub-picture tracks on the canvas; and a track matrix composition specifying an order and a matrix used to overlay each of the plurality of two-dimensional sub-picture tracks on the canvas.

There has thus been outlined, rather broadly, the features of the disclosed subject matter in order that the detailed description thereof that follows may be better understood, and in order that the present contribution to the art may be better appreciated. There are, of course, additional features of the disclosed subject matter that will be described hereinafter and which will form the subject matter of the claims appended hereto. It is to be understood that the phraseology and terminology employed herein are for the purpose of description and should not be regarded as limiting.

BRIEF DESCRIPTION OF DRAWINGS

In the drawings, each identical or nearly identical component that is illustrated in various figures is represented by a like reference character. For purposes of clarity, not every component may be labeled in every drawing. The drawings are not necessarily drawn to scale, with emphasis instead being placed on illustrating various aspects of the techniques and devices described herein.

FIGS. 4A-4B show an exemplary table of blending modes, according to some examples.

FIG. 5 shows an exemplary track overlay composition structure used for blending, according to some embodiments.

FIG. 6 shows an exemplary track grid composition structure used for blending, according to some embodiments.

FIG. 7A shows an exemplary transformation matrix composition structure used for blending, according to some embodiments.

DETAILED DESCRIPTION OF INVENTION

Various techniques can be used to derive composite tracks, including deriving composite tracks of file formats, such as ISOBMFF.

The inventors have determined that existing techniques for deriving composite tracks do not provide for robust track composition. For example, to perform a composition, a number of sub-picture tracks can be composed to form a viewport. However, during the composition, the canvas (e.g., which may also be referred to as a composition layout) may include various layouts, such as gaps between images from the sub-picture tracks, and/or overlays with overlapping images from the sub-picture tracks. The inventors have developed technological improvements to existing file formats for deriving composite tracks. The techniques can include applying metadata to groups of sub-picture tracks. The techniques can allow sub-picture track groups to be specified in a manner that allows metadata to be associated with the composite content of the track group rather than needing to be individually specified for each sub-picture track. The metadata can specify how track derivation for the composite content is performed. In some examples, the techniques can be used, for example, to specify criteria for gap and/or overlay cases, including determining the background to use for fill and/or merge.

In the following description, numerous specific details are set forth regarding the systems and methods of the disclosed subject matter and the environment in which such systems and methods may operate, etc., in order to provide a thorough understanding of the disclosed subject matter. In addition, it will be understood that the examples provided below are exemplary, and that it is contemplated that there are other systems and methods that are within the scope of the disclosed subject matter.

Figure 1:
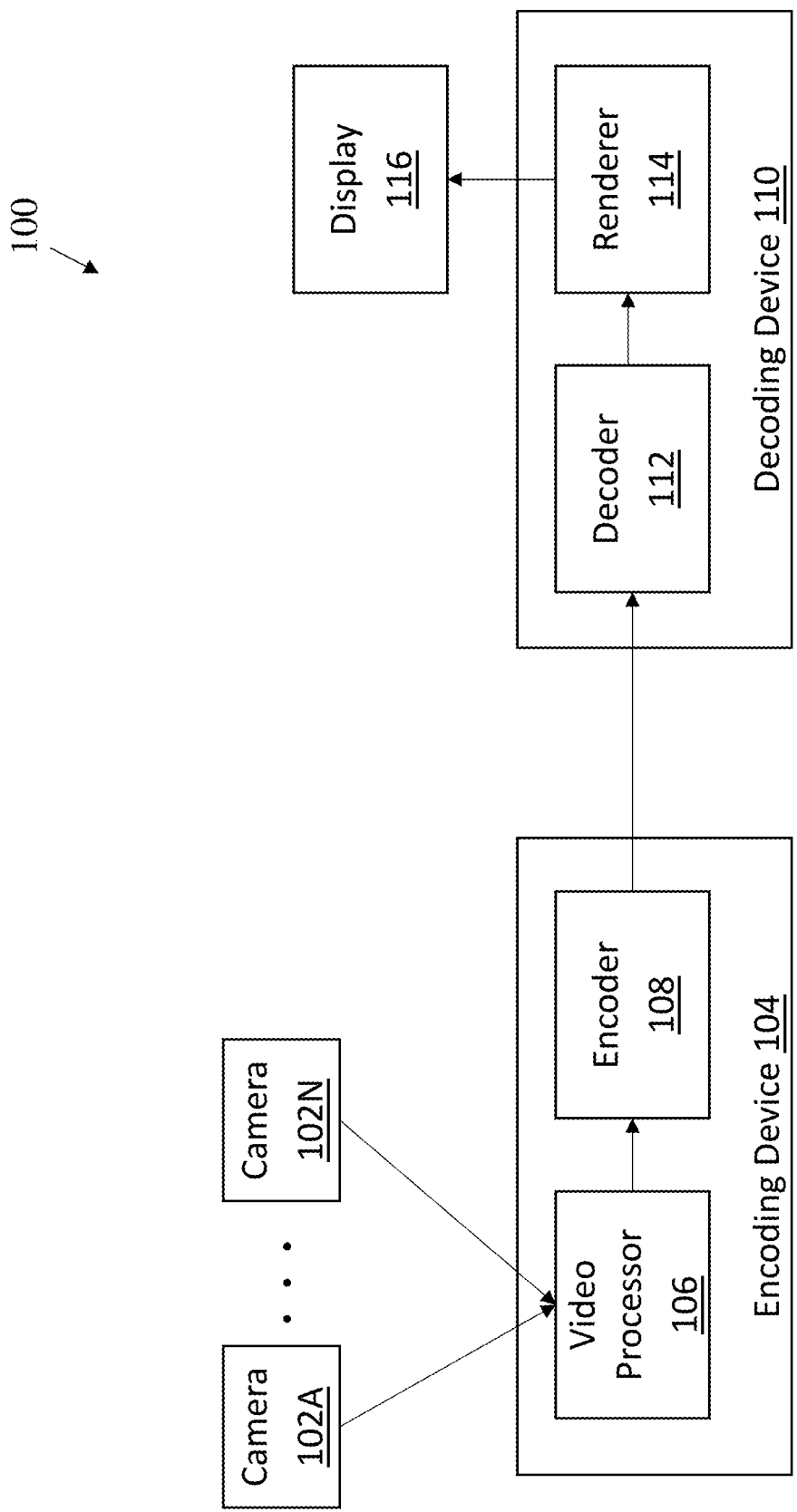
FIG. 1 shows an exemplary video coding configuration, according to some embodiments.

FIG. 1 shows an exemplary video coding configuration 100, according to some embodiments. Cameras 102A-102N are N number of cameras, and can be any type of camera (e.g., cameras that include audio recording capabilities, and/or separate cameras and audio recording functionality). The encoding device 104 includes a video processor 106 and an encoder 108. The video processor 106 processes the video received from the cameras 102A-102N, such as stitching, projection, and/or mapping. The encoder 108 encodes and/or compresses the two-dimensional video data. The decoding device 110 receives the encoded data. The decoding device 110 may receive the video as a video product (e.g., a digital video disc, or other computer readable media), through a broadcast network, through a mobile network (e.g., a cellular network), and/or through the Internet. The decoding device 110 can be, for example, a computer, a hand-held device, a portion of a head-mounted display, or any other apparatus with decoding capability. The decoding device 110 includes a decoder 112 that is configured to decode the encoded video. The decoding device 110 also includes a renderer 114 for rendering the two-dimensional content back to a sphere. The display 116 displays the rendered content from the renderer 114.

A region of interest (ROI) is somewhat similar in concept to viewport. An ROI may, for example, represent a region in 3D or 2D encodings of omnidirectional video. An ROI can have different shapes (e.g., a square, or a circle), which can be specified in relation to the 3D or 2D video (e.g., based on location, height, etc.). For example, a region of interest can represent an area in a picture that can be zoomed-in, and corresponding ROI video can be displayed for the zoomed-in video content. In some implementations, the ROI video is already prepared separately. In such implementations, a region of interest typically has a separate video track that carries the ROI content. Thus, the encoded video can be used to specify the ROI, and how the ROI video is associated with the underlying video.

ROI or viewport tracks, such as separately encoded ROI tracks, can be associated with main video. For example, an ROI can be associated with a main video to facilitate zoom-in and zoom-out operations, where the ROI is used to provide content for a zoom-in region. For example, MPEG-B, Part 10, entitled "Carriage of Timed Metadata Metrics of Media in ISO Base Media File Format," dated Jun. 2, 2016 (w16191), which is hereby incorporated by reference herein in its entirety, describes an ISO Base Media File Format (ISOBMFF) file format that uses a timed metadata track to signal that a main 2D video track has a 2D ROI track.

Generally, 3D content can be represented using spherical content to provide a 360 degree view of a scene (e.g., sometimes referred to as omnidirectional media content). While a number of views can be supported using the 3D sphere, an end user typically just views a portion of the content on the 3D sphere. The bandwidth required to transmit the entire 3D sphere can place heavy burdens on a network, and may not be sufficient to support spherical content. It is therefore desirable to make 3D content delivery more efficient. Viewport dependent processing can be performed to improve 3D content delivery. The 3D spherical content can be divided into regions/tiles/sub-pictures, and only those related to viewing screen (e.g., viewport) can be transmitted and delivered to the end user.

Figure 2:
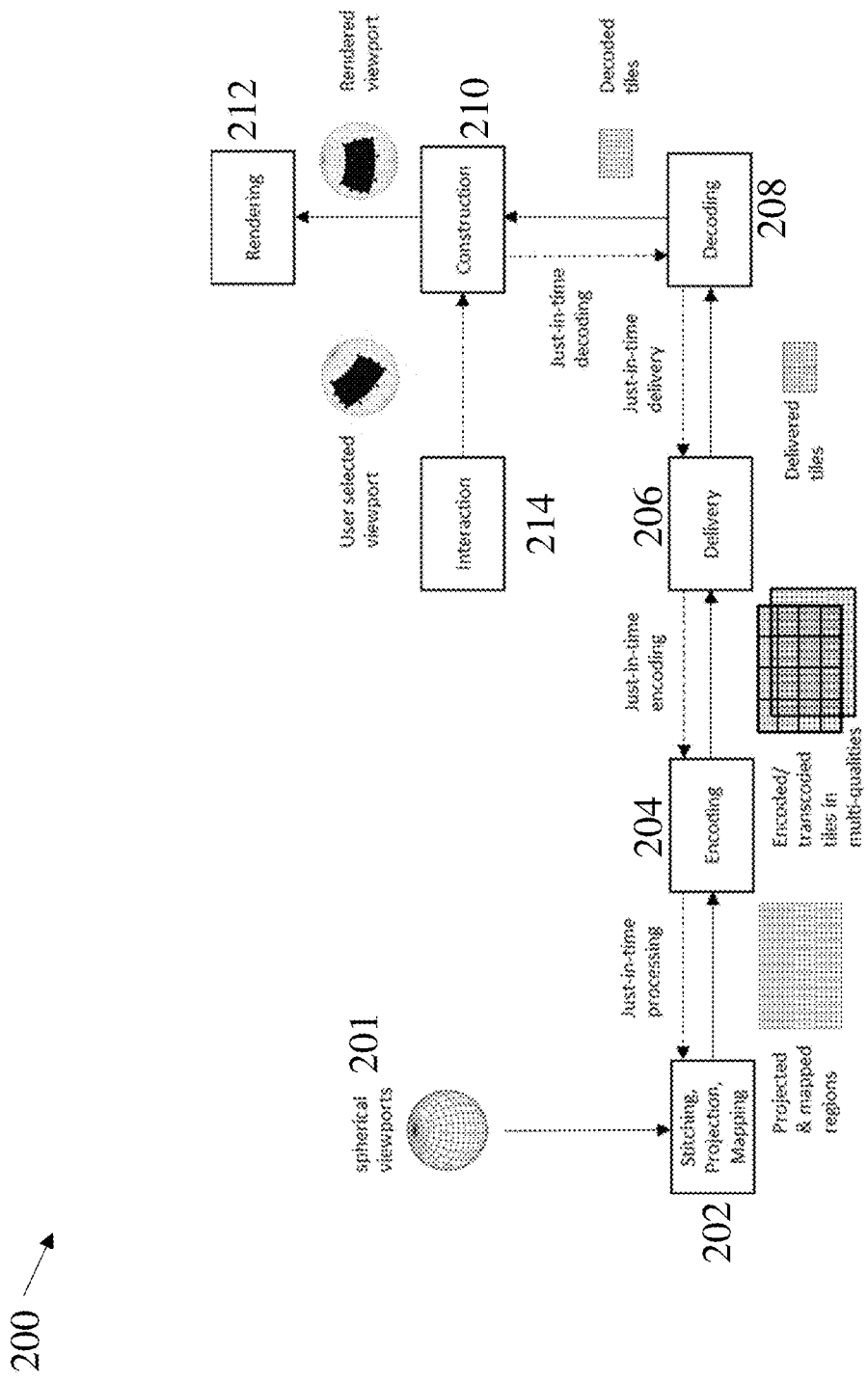
FIG. 2 a viewport dependent content flow process for VR content, according to some examples.

FIG. 2 shows a viewport dependent content flow process 200 for VR content, according to some examples. As shown, spherical viewports 201 (e.g., which could include the entire sphere) undergo stitching, projection, mapping at block 202 (to generate projected and mapped regions), are encoded at block 204 (to generate encoded/transcoded tiles in multiple qualities), are delivered at block 206 (as tiles), are decoded at block 208 (to generate decoded tiles), are constructed at block 210 (to construct a spherical rendered viewport), and are rendered at block 212. User interaction at block 214 can select a viewport, which initiates a number of "just-in-time" process steps as shown via the dotted arrows.

In the process 200, due to current network bandwidth limitations and various adaptation requirements (e.g., on different qualities, codecs and protection schemes), the VR content presented using 3D spherical or any other 3D model is first processed (stitched, projected and mapped) onto a 2D plane (by block 202) and then encapsulated in a number of tile-based (or sub-picture-based) and segmented files (at block 204) for delivery and playback. In such a tile-based and segmented file, a spatial tile in the 2D plane (e.g., which represents a spatial portion, usually in a rectangular shape of the 2D plane content) is typically encapsulated as a collection of its variants, such as in different qualities and bit rates, or in different codecs and protection schemes (e.g., different encryption algorithms and modes). In some examples, these variants correspond to representations within adaptation sets in MPEG DASH. In some examples, it is based on user's selection on a viewport that some of these variants of different tiles that, when put together, provide a coverage of the selected viewport, are retrieved by or delivered to the receiver (through delivery block 206), and then decoded (at block 208) to construct and render the desired viewport (at blocks 210 and 212).

As shown in FIG. 2, the viewport notion is what the end-user views, which involves the angle and the size of the region on the sphere. The viewport can change and is therefore not static. For example, as a user moves their head, then the system needs to fetch neighboring tiles (or sub-pictures) to cover the content of what the user wants to view next. However, after performing viewport dependent processing, e.g., including chopping pictures and/or encode different qualities, techniques do not allow for specifying or associating metadata (e.g., related to the background and/or blending) to the entire picture, or to the entire 3D spherical content.

In some embodiments, the viewport or ROI can be signaled using a composite track. Using a composite track provides a single track that can be used to represent the content of the variant tracks of a tile. As a further example, using composite tracks can help build a track hierarchy to indicate how tracks are related in terms of composite relationship, e.g., when the composite tracks are derived from variant tracks and (composite) tile tracks.

A derived track can be identified by the track containing sample entry of the type 'dtrk.' A derived sample can contain an ordered list of the operations to be performed sequentially on an ordered list of corresponding images or samples from an ordered list of input tracks. Each of the operations can be specified or indicated by the TransformProperty. For example, a list of TransformProperty operations can include identity ('idtt'); clean aperture ('clap'); rotation ('srot'); dissolve ('dslv'); crop ('2dcc'); and/or the like.

In order to support VR viewport dependent content flow processes, additional TransformProperty items can be used to derive composite tracks from existing tracks. Various types of composite tracks can be generated, such as a composite of all video tracks ('cmpa'), a composite of only one track ('cmp1,' which can allow switching at the sample and sample group levels), a composite of any track ('cmpn,' which can allow switching at the sample and sample group levels), a selection of only one track ('sel1,' which can be a track level selection, and may not include switching at the sample level), a selection of any track ('seln,' which can be track level selection, and may not include switching at the sample level), a scaling ('scal'), a resize ('resz'), and/or the like.

For example, the 'cmpa' transform property can specify a reference width and height of a derived sample, and can place (e.g., composes) each input image onto the derived sample at its corresponding specified x,y location and specified size. The 'cmp1' transform property can specify a reference width and height of a derived sample, and can place one, anyone and only one of the input images onto the derived sample at its corresponding location and corresponding size. The 'cmpn' transform property can specify a reference width and height of a derived sample, and can place one or more of the input images onto the derived sample at their corresponding location and with their corresponding size. The 'sel1' transform property can specify a reference width and height of a derived sample, and can place one or more of the input images onto the derived sample at their corresponding location and corresponding size. The 'sel1' transform property can be like selecting one track from a list of input tracks. The 'seln' transform property can specify a reference width and height of a derived sample, and can place one or more input images from a same subset of input tracks selected throughout the entire transformation onto the derived sample at their corresponding location and with their corresponding size. The 'seln' transform property can be like selecting n (n>0) tracks from a list of input tracks.

Essentially, the 'cmpa,' 'cmp1,' 'cmpn,' 'sel1,' and 'seln' operations specify a number of '2dcc' like fields that provide 2D spatial information for composing input 2D image samples onto a derived 2D image sample, according to their respective definition and semantics. According to some embodiments, with these additional TransformProperty items, a "tile" track can be specified as a derived, composite track of its "variant" tracks using 'cmp1' or 'sel1." A track of the entire VR spherical content, when projected onto a 2D plane, can be specified as a derived, composite track of its "tile" tracks using 'cmpa.' A viewport or ROI track can be specified as a derived, composite track of its "tile" tracks using 'cmpn' or 'seln' The techniques described in m33971, entitled "Deriving Composite Tracks in ISOBMFF," dated January, 2017, which is hereby incorporated by reference herein in its entirety, provide techniques for mapping the 2D composite track back to spherical 3D content.

Figure 3:
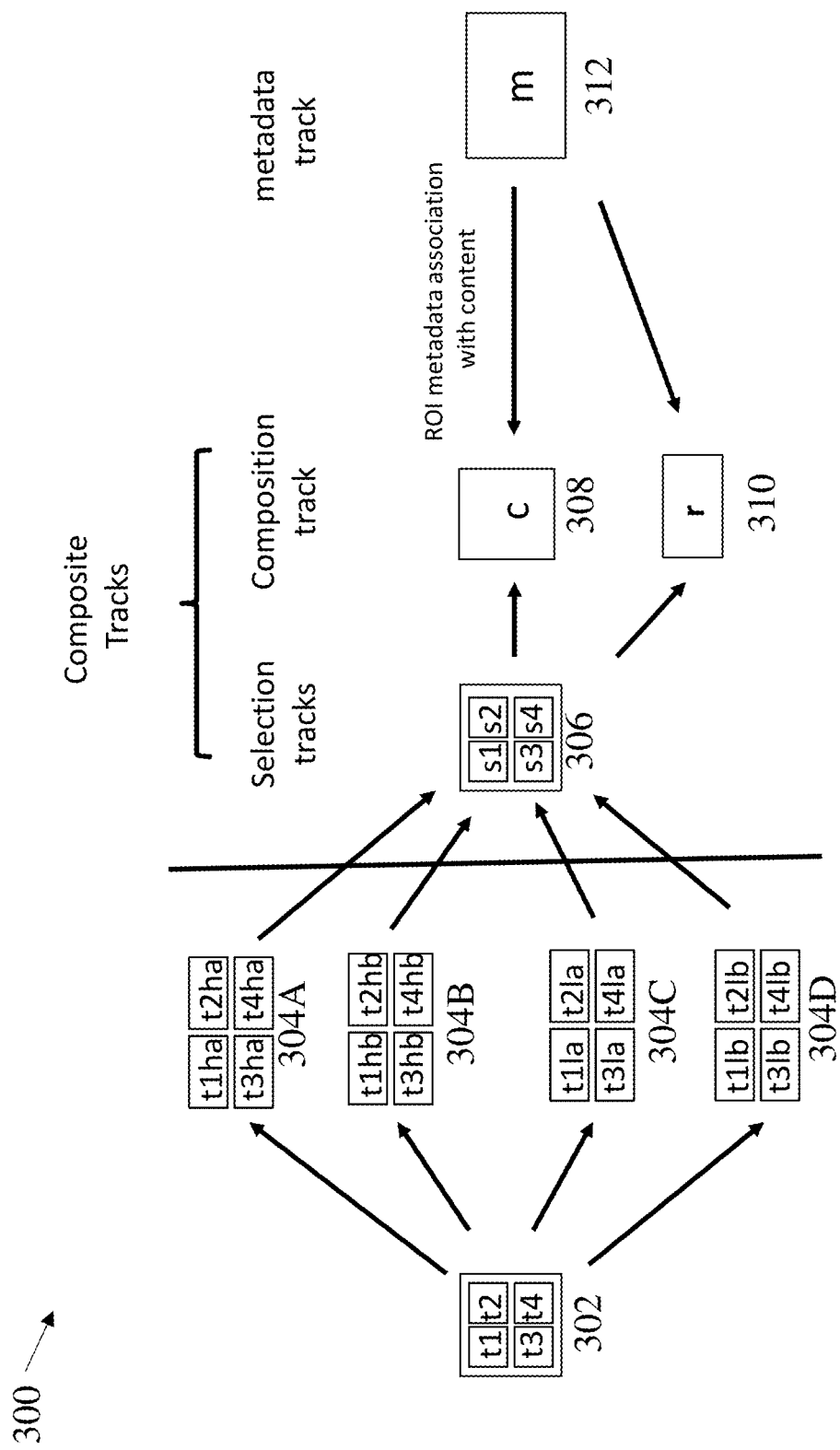
FIG. 3 shows an exemplary diagram of using a composite track to signal a viewport/ROI, according to some embodiments.

FIG. 3 shows an exemplary diagram 300 of using a composite track to signal a viewport/ROI, according to some embodiments. Four 2D sub-picture (or tile) tracks t1-t4 (302) are encoded for two different qualities (e.g., 'h' for HD and 's' for SD) and two different encryption modes (e.g., the Common Encryption Scheme (CENC) with encryption modes 'a' for Counter (CTR) and 'b' for Cipher Block Chaining (CBC)). The encoding and encryption generates four different groups of four tracks 304A-D (referred to as encoded tracks 304, generally), for a total of sixteen tracks. Encoded tiles 304A correspond to a high quality ('h') encoded using a first encryption mode ('a') (thus, 'ha'). Encoded tiles 304B correspond to a high quality ('h') encoded using a second encryption mode ('b') (thus, 'hb'). Encoded tiles 304C correspond to low quality ('l') encoded using a first encryption mode ('a') (thus, 'la'). Encoded tiles 304D correspond to a low quality ('l') encoded using a second encryption mode ('b') (thus, 'lb').

The composite track is generated based on the encoded tracks 304. Tiles are selected from the encoded tracks 304. The tiles can be selected based on one or more transform properties (e.g., in a list of TransformProperties, as discussed above). For example, four tiles s1-s4 s4 are selected, according to the operations shown below for this example:

s1=sel1{cmp1{t1*ha*, t1*la*}, cmp1{t1*hb*, t1*lb*}}
s2=sel1{cmp1{t2*ha*, t2*la*}, cmp1{t2*hb*, t2*lb*}}
s3=sel1{cmp1{t3*ha*, t3*la*}, cmp1{t3*hb*, t3*lb*}}
s4=sel1{cmp1{t4*ha*, t4*la*}, cmp1{t4*hb*, t4*lb*}}

Referring to the exemplary operations above, composition (cmp1) and selection (sel1) are used because the composite track is coming from a number of different tracks encoded using different qualities and encryption modes. Quality variants are composed first using 'cmp1' and then encryption variants are composed using 'sel1.' For example, assume an m×n grid of sub-picture tracks, where each sub-picture has q different qualities and is encrypted in 2 modes, then there are m×n×q×2 tracks. But when adaptively streaming the content, only the quality for underlying connection bandwidth is dynamically selected, whereas the encryption mode is statically selected. Therefore, 'cmp1' is used to select the appropriate quality tile at the sample or sample group level, and 'sel1' is used to select the appropriate encrypted tile at the track level, as discussed above.

A composition is performed on the selected tracks 306 to composite the sub-pictures into 2D content tracks. The composition process generates a composition track C 308 and composition track r 310. The composition track C 308 can include data from all of the selected tracks 306, whereas the composition track r 310 can include data from a subset of the selected tracks 306. The composition track C 308 can be generated using, for example, cmpa{s1, s2, s3, s4}, which composites all the tiles. In some embodiments, if an ROI or viewport involves or is covered by any of the tiles t1, t2, t3 and t4, an ROI or viewport track can be determined using 'cmpn' (e.g., and/or possibly other transform properties if crop, resize or rotation are involved). For example, the ROI or viewport composition track r 310 can be determined using cmpn{s1, s2, s3, s4}. In some embodiments, if an ROI or viewport involves or is covered by only tiles t1 and t2, an ROI or viewport track can be determined using 'cmpa' (e.g., and/or possibly other transform properties if crop, resize or rotation are involved). For example, the composition track r 310 can be generated as cmpa{s1, s2}. The encoder generates a metadata track m 312, such as a timed metadata track.

As shown in FIG. 2, the viewport notion is what the end-user views, which can be specified based on the angle and/or the size of the viewing region on the 3D sphere. As noted, the viewport is not static. For example, as a user moves their head, then the viewport changes so the system needs to fetch other tiles (or sub-pictures), such as neighboring tiles, to cover the content of what the user wants to view next. However, after performing viewport dependent processing, e.g., including chopping pictures and/or encode different qualities, techniques do not allow for specifying or associating metadata to the entire picture, or to the entire 3D spherical content. For example, existing techniques do not provide for specifying composition layout operations, including compensating for composition layouts, such as gaps and overlaps.

File formats, such as MPEG file formats, can include techniques to construct and/or derive tracks. For example, derivation techniques can be used to combine tiles/sub-pictures into larger pictures, e.g., to indicate that the larger picture has certain regions. Some techniques can operate in the temporal domain, e.g., to aggregate or extract temporal segments from other tracks. Image processing operations can also be used to construct and/or derive tracks, and can include, for example, identity, crop, rotation, and/or dissolve operations. Track constructions and/or derivations can be used to take one copy from one track and then concatenate that to another feature from another track to form programs. For example, they can be used to play a commercial and then switch to another commercial, and so on. As another example, they can be used to insert a commercial into a program (e.g., as a derivation with a construction track from two different tracks—one from the commercial track and one from the TV track).

File formats can include transformations, such as a transformation matrix (e.g., which can be in the track header). Each track header can have a transformation matrix to specify how the pixels of the track itself are transformed into a larger picture, e.g., when being placed into a different/larger picture. The transformation matrix can be used for simple operations (e.g. pixel doubling, 90° rotation) and/or complex operations (e.g., shearing, arbitrary rotation). File formats can also include blending metadata, such as alpha blending metadata, which can be used to perform alpha blending of two entities. The alpha blending metadata can be used for gaps or overlapping portions when putting tracks together. So blending metadata can be used to anticipate overlay and/or gaps, and can be used to specify how the overlay should be done, how a gap should be filled (e.g., the gap can be filled with the background, video, etc.), and/or the like.

In some embodiments, the alpha blending parameters can include compositing information, mode information, and/or specific parameters. For example, for ISOBMFF, a number of fields can be specified for the alpha blending metadata. The compositing_top_left_x and compositing_top_left_y fields can specify the top-left corner of the compositing space relative to the reference coordinate origin which may be specified by an application, or by a container format containing the base track and tile tracks of media data. The compositing_width and compositing_height fields can specify the width and height of the output image after composition. A field alpha_blending_mode can specify the alpha blending mode. A table with the various modes and the associated algorithms with default parameters may be specified in a separate document, e.g. ISO/IEC 23001-8 and/or a W3C recommendation. An exemplary table 400 of values for alpha_blending_mode is shown in FIGS. 4A-4B. The parameter value of 'layer' in TrackHeaderBox of each track, which specifies the front-to-back ordering of visual tracks, may be set and used as a relative front and back layer indicator for compositing two tracks. In the table 450, terms 'Source' and term 'Destination' are used interchangeably for the front/top layer and the back/bottom layer or the backdrop, respectively. A field blending_mode_specific_params can specify optional parameters with a given blending mode (e.g., other than using the default values specified in, e.g. ISO/IEC 23001-8, it may include alpha channel data).

The inventors have determined that existing file format techniques (e.g., such as composition and grouping) do not provide for associating global information about the entire 3D content (for example, the 3D content to representing the VR content) to sub-picture tracks. For example, existing techniques may not allow metadata to be associated with the full picture, such as metadata to identify a particular region of interest within a full picture. For example, it may be desirable to identify a portion of the 3D content for the user to view (e.g., if at some angle or viewpoint there is something you would like to call out to a remote user, it is desirable to highlight that part of the 3D content). However, since viewport dependent processing techniques may break the full 3D picture, it may not be possible to identify a portion of the content to point out to the user. Therefore, existing techniques do not provide for associating any global information about entire picture to sub-picture tracks without derivation. As a further example, existing techniques to do not provide for specifying compositions with overlay and/or background operations (e.g., gap filling, such as with a color or image, and/or overlay techniques).

The inventors have developed technological improvements to existing file formats for deriving composite tracks. The techniques can include applying metadata to groups of sub-picture tracks. The techniques can allow sub-picture track groups to be specified in a manner that allows metadata to be associated with the track group rather than needing to be individually specified for each sub-picture track. The metadata can specify how track derivation is performed. In some examples, the techniques can be used, for example, to specify criteria for layout (including gap and overlay) cases, including determining the background to use for fill and/or merge.

In some embodiments, the composition track derivation can be performed using one or more of the following mechanisms. In some embodiments, the image overlay mechanism is used in the image file format. In some embodiments, the image grid mechanism is used in the image file format. In some embodiments, matrix values (e.g., in the header information of tracks, such as in ISOBMFF) provide transformation information about sub-picture tracks, such as spatial composition information. Using such techniques, for example, an entire 2D frame track can be specified as a derived composition track of its tile or sub-picture tracks, and any ROI track can be specified as a derived composite track of its related covering tile or sub-picture tracks.

In some examples, such as according to the MPEG ISOBMFF file format, an item is a derived image item when it includes a 'dimg' item reference to one or more other image items, which are inputs to the derivation. The exact operation performed to obtain the reconstructed image is identified by the item_type of the item. The image items used as input to a derived image item are output images of other image items, which may be coded image items or derived image items.

An example of a derived image type is an identity derivation. A derived image item of the item_type value 'iden' (identity transformation) may be used to apply transformative properties to derive an image item. The derived image item typically has no item body (e.g., no extents), and reference_count for the 'dimg' item reference of an 'iden' derived image item can be equal to 1.

Another example of a derived image type is an image overlay derivation. An item with an item_type value of 'iovl' can specify a derived image item by overlaying one or more input images in a given layering order within a larger canvas. The input images can be listed in the order they are layered, e.g., the bottom-most input image first and the top-most input image last, in the SingleItemTypeReferenceBox of type 'dimg' within the ItemReferenceBox.

FIG. 5 shows an exemplary track overlay composition structure 500 used for overlay including possible gaps and blending, according to some embodiments. As shown by the structure 500, the class TrackOverlayComposition 502 extends the Composite of All 'tocp' transform property 504. When present, 'tocp' requires that the number of input entries num_inputs 534 is greater or equal to 1, and the input entities are visual tracks. Generally, the 'tocp' transform property specifies a derived track, each of whose samples is a larger canvas overlaid with sample images of one or more input tracks in the layering order that is same as the order they are listed (e.g., the bottom-most input image is layered first as the base layer, and each additional layer is layered subsequently up to the top-most input image, which is layered last). As discussed further below, the techniques include incorporating background and blending information within the overlay composition structure 500, such as the canvas color, image, and/or video background. Such information can be specified (and used), e.g., when the input sample images do not cover the entire canvas background. This can be useful, for example, for 360 degree VR content where the VR video does not cover the entire spherical surface. In some embodiments, the background video, if used, could be handled as one of the input videos in the video overlay case. In this non-limiting example, the background video is handled as an additional to the input videos.

Referring further to FIG. 5, the structure 500 can include various parameters. The structure 500 can include a version 506 field. In this example, the version is equal to 0, although the version number can be increased as new versions are created. The version number can be used, for example, such that readers shall not process a TrackOverlayComposition with an unrecognized version number.

The structure 500 can include a flags field 508. The flags field in this example can be used to indicate a number of bits of fields. For example, (flags & 1) equal to 0 can specify that the length of the fields output_width 510, output_height 512, horizontal_offset 514, and vertical_offset 516 is 16 bits. As another example, (flags & 1) equal to 1 can specify that the length of the fields output_width 510, output_height 512, horizontal_offset 514, and vertical_offset 516 is 32 bits. The values of flags greater than 1 can be reserved. The output_width 510 and output_height 512 fields can specify the width and height, respectively, of the reconstructed image on which the input images are placed. The image area of the reconstructed image can be referred to as the canvas. The num_input 534 can specify the number of input entries to this track derivation operation. The horizontal_offset 514 and vertical_offset 516 can specify the offset, from the top-left corner of the canvas, to which the input image is located. Pixel locations with a negative offset values may not be included in the reconstructed image. Horizontal pixel locations greater than or equal to output_width 510 may not be included in the reconstructed image. Vertical pixel locations greater than or equal to output_height 512 may not be included in the reconstructed image.

Block 518 shows the portion of structure 500 related to the background and blending information, as discussed further below. The background_flag 520 can be used to indicate what kind(s) of backgrounds can be used for deriving a composition track. In this example, a zero value indicates that no background is specified. When (background_flag & 1) is equal to 1, the background is a colored background, with the color value specified by canvas_fill_value 522. The canvas_fill_value 522 can indicate the pixel value per channels used if no pixel of any input image is located at a particular pixel location. The fill values can be specified as RGBA (e.g., Red, Green, Blue, and A corresponding to loop counter j equal to 0, 1, 2, and 3, respectively). The RGB values can be in the sRGB color space as specified in IEC 61966-2-1. The A value can be a linear opacity value ranging from, for example, 0 (fully transparent) to 65535 (fully opaque).

When (background_flag & 2) is equal to 2, the background is an image identified by image_item_ID 524, scaled (whenever needed) to cover the background with the sizes specified by output_width 510 and output_height 512. The image_item_ID 524 can specify an ID to an image item. When (background_flag & 2) is equal to 3, the background is a video sample image identified by video_track_ID 526, scaled (whenever needed) to cover the background with the sizes specified by output_width 510 and output_height 512. The video_track_ID 526 can specify an ID to a video track.

The blending_flag 528 indicates if blending is involved when overlaying input visual tracks in deriving the composition track. The alpha_blending_mode 530 specifies the alpha blending mode (e.g., with possible values of "Composition mode" in the exemplar table in FIG. 4). In some embodiments, a table and/or the associated algorithms with default parameters may be specified in a separate document, e.g. ISO/IEC 23001-8 and/or a W3C recommendation. The parameter value of 'layer' in TrackHeaderBox of each track, which specifies the front-to-back ordering of visual tracks, may be set and used as a relative front and back layer indicator for compositing two tracks. In the table in FIGS. 4A-4B, the terms 'Source' and term 'Destination' can be used interchangeably for the front/top layer and the back/bottom layer or the backdrop, respectively. The blending_mode specific_params 532 can specify optional parameters with a given blending mode other than using those of default values specified in, e.g. ISO/IEC 23001-8. For example, blending_mode specific_params 532 may include alpha channel data that can be used for the selected alpha blending mode.

An item with an item_type value of 'grid' specifies a derived image item whose reconstructed image is formed from one or more input images in a given grid order within a larger canvas. FIG. 6 shows an exemplary track grid composition structure 600 used for blending, according to some embodiments Like the structure 500 discussed in conjunction with FIG. 5, the structure 600 can be used to specify overlay parameters such as background and blending information. The structure 600 can be used to assemble a grid of sub-pictures. For example, it may be desirable to assemble two neighboring sub-pictures together. To prevent a gap effect for an overlay, when specifying the pictures a guard band can also be specified (e.g., more of a guard band can be specified to cover to the neighboring picture). For example, even though there may be a grid of sub-pictures that is m×n in dimension, when putting the sub-pictures together there may still be overlay and/or they may not cover the entire picture. Therefore, the structure 600 can allow for specifying the output width and/or height in a manner that is larger than the grid size. The structure 600 can also allow for specifying the rows and columns—do minus one because always want to start with zero.

As shown by the structure 600, the class TrackGridComposition 602 extends the Composite of All 'tgcp' transform property 604. When present, 'tgcp' requires that the number of input entries num_input is greater or equal to 1, and the input entities are visual tracks. This transform property specifies a derived track, each of whose samples is a larger canvas overlaid with sample images of one or more input tracks in a given grid order. The sample images of the input visual tracks are inserted in row-major order, top-row first, left to right, in the order they are listed as the input tracks. The value of num_input shall be equal to rows*columns. Each sample image can be configured to have the same width and height, tile_width and tile_height. The width and height can be specified within each input track.

The tiled input sample images may (or may not) completely "cover" the derived sample image grid canvas. For example, tile_width*columns may (or may not) be greater than or equal to output_width 612 and/or tile_height*rows may (or may not) be greater than or equal to output_height 613, which are discussed further herein. As a non-limiting example, the derived sample image can be formed by tiling the input sample images into a grid with a column width (potentially excluding the right-most column) equal to tile_width and a row height (potentially excluding the bottom-most row) equal to tile_height, without gap or overlap, and then trimming on the right and the bottom to the indicated output_width and output_height. A canvas, image, and/or video background can be used when the tiled image does not cover the entire canvas background. As noted above, this can be useful, for example, for 360 degree VR content where the VR video does not cover the entire spherical surface.

Referring further to FIG. 6, the structure 600 can include various parameters, as explained further below. The structure 600 can include a version 606 field. In this example, the version is equal to 0, although the version number can be increased as new versions are created. The version number can be used, for example, such that readers shall not process a TrackGridComposition with an unrecognized version number.

The structure 600 can include a flags field 608. The flags field in this example can be used to indicate a number of bits of fields. For example, as explained above, (flags & 1) equal to 0 can specify that the length of the fields output_width 612, output_height 613, horizontal_offset 614, and vertical_offset 615 is 16 bits and/or (flags & 1) equal to 1 can specify that the length is 32 bits.

Block 618 shows the portion of structure 600 related to the background and blending information, as discussed further below. The background_flag 620 can be used to indicate what kind(s) of backgrounds can be used for deriving a composition track. In this example, a zero value can indicate that no background is specified. When (background_flag & 1) is equal to 1, the background is a colored one, with the color value specified by canvas_fill_value 622. As noted herein, the canvas_fill_value 622 can indicate the pixel value per channels used if no pixel of any input image is located at a particular pixel location. The fill values can be specified as RGBA (R, G, B, and A corresponding to loop counter j equal to 0, 1, 2, and 3, respectively), as discussed above.

When (background_flag & 2) is equal to 2, the background is an image identified by image_item_ID 624, scaled (e.g., if/whenever needed) to cover the background with the sizes specified by output_width and output_height. When (background_flag & 2) is equal to 3, the background is a video sample image identified by video_track_ID, scaled (whenever needed) to cover the background with the sizes specified by output_width and output_height. The image_item_ID 624 specifies an ID to an image item. The video_track_ID 626 specifies an ID to a video track.

As discussed above, the blending_flag 628 indicates if blending is involved when overlaying input visual tracks in deriving the composition track. The alpha_blending_mode 630 specifies the alpha blending mode, as discussed above. The blending_mode_specific_params 632 can specify optional parameters with a given blending mode other than using default values, such as those specified in, e.g., ISO/IEC 23001-8, and it may include alpha channel data.

The parameters rows_minus_one 610 and columns_minus_one 611 can specify the number of rows of sample images of the input visual tracks, and the number of sample images of the input visual tracks per row. The value can be one less than the number of rows or columns, respectively. The sample images of the input visual tracks can populate the top row first, followed by the second and so on, in the listing order of the input visual tracks. As discussed above, the output_width 612 and the output_height 614 can specify the width and height, respectively, of the reconstructed image on which the input images are placed. The image area of the reconstructed image is referred to as the canvas.

The horizontal_offset 614 and the vertical_offset 615 specifies the offset, from the top-left corner of the canvas, to which the first input image is located. Pixel locations with a negative offset value may not be included in the reconstructed image. Horizontal pixel locations greater than or equal to output_width 612 may not be included in the reconstructed image. Vertical pixel locations greater than or equal to output_height 613 may not be included in the reconstructed image.

In the exemplary embodiment of structure 600, only one of the horizontal_offset 614 and vertical_offset 615 need to be specified (e.g., unlike with structure 500, which uses both offsets to performed a loop). For structure 600, the techniques do not perform a loop—only one needs to be specified because the offset can be used for the entire grid. For example, if starting from the left-most corner, the offset can be specified for that location, and used for subsequent processing.

Figure 7B:
FIG. 7B shows an exemplary transformation matrix, according to some embodiments.

A transformation matrix, such as in ISOBMFF is specified in MovieHeaderBox 'mvhd' and TrackHeaderBox 'trkd' for processing decoded track media for presentation. With this matrix, the overall movie and/or each track may be transformed by means of the matrix. This can permit both simple operations (e.g., pixel doubling, correction of 90° rotation) as well as more complex operations (e.g., shearing, arbitrary rotation). FIG. 7A shows an exemplary transformation matrix composition structure 700 used for blending, according to some embodiments. Like the structures 500 and 600 discussed in conjunction with FIGS. 5 and 6, respectively, the structure 700 can be used to specify overlay parameters. The structure 700 can be used to specify matrix values for compositions.

As shown by the structure 700, the class TrackMatrixComposition 702 extends the Composite of All 'tmcp' transform property 704. When 'tmcp' is present, it requires that the number of input entries num_input is greater or equal to 1, and the input entities are visual tracks. The 'tmcp' transform property can specify a derived track, each of whose sample images is a larger canvas overlaid with sample images of one or more input tracks in the layering order that is same as the order they are listed, e.g., the bottom-most input image is layered first and then each subsequent image is layered up to the top-most input image, which is layered last. The size of the canvas is specified by output_width 710 and output_height 711. As discussed further herein, the time-parallel samples of the input tracks can be spatially arranged onto the canvas according to the syntax and semantics of the matrix values in the input track headers. For example, the sizes and/or locations of sample images of the input tracks can be specified by width, height, and matrix within the TrackHeaderBox 'trkd'. As discussed above with reference to FIGS. 5-6, the canvas/image/video background can be used when the input sample images do not cover the entire canvas background.

Referring to FIG. 7A, the structure 700 can include various parameters. The structure 700 can include a version 706 field and a flags field 708, e.g., like the version and flag fields discussed in conjunction with FIGS. 5-6. In structure 700, the flags field 708 can specify the length of the fields output_width 710, output_height 711, width 712 and height 713.

Block 718 shows the portion of structure 700 related to the background and blending information, as discussed in conjunction with FIGS. 5-6. By way of recap, the background_flag 720 can be used to indicate what kind(s) of backgrounds can be used for deriving a composition track. In this example, a zero value can indicate that no background is specified. When (background_flag & 1) is equal to 1, the background is a colored one, with the color value specified by canvas_fill_value 722 (e.g., specified as RGBA, as discussed above). When (background_flag & 2) is equal to 2, the background is an image identified by image_item_ID 724, scaled (e.g., if/whenever needed) to cover the background, as discussed above. When (background_flag & 2) is equal to 3, the background is a video sample image identified by video_track_ID 726, scaled (whenever needed) to cover the background, as discussed above.

As also discussed above, the blending_flag 728 indicates if blending is involved when overlaying input visual tracks in deriving the composition track. The alpha_blending_mode 730 specifies the alpha blending mode, and the blending_mode_specific_params 732 can specify optional parameters with a given blending mode, as discussed above.

Unlike the exemplary structures 500 and 600 discussed in conjunction with FIGS. 5-6, respectively, structure 700 includes a matrix_flag 734. The matrix flag 734 can indicate whether to use other matrix information, such as the matrix in the track header. For example, the matrix flag 734 can indicate whether the matrix, width and height values in the track headers of the input visual tracks are not available and/or are not to be used (or to be overwritten). When other such matrix information is not available and/or not to be used (e.g., matrix_flag=1), these values are provided for the input visual tracks. The num_inputs field 736 specifies the number of input entries to this track derivation operation.

The matrix 738 provides a transformation matrix for the video. For example, the point (p, q) can transformed into (p', q') using the matrix 750 shown in FIG. 7B, according to some embodiments. The values in the matrix 750 are stored in the order {a,b,u, c,d,v, x,y,w}. The matrix 750 is multiplied by (p, q, 1) to calculate (m, n, z), where m=ap+cq+x;

n=bp+dq+y; and z=up+vq+w. Then (m, n, z) can be used to calculate (p', q') by calculating p'=m/z; q'=n/z. In this example in FIG. 7A, (u,v,w) of matrix 738 are restricted to (0,0,1), hex (0,0,0×40000000). In some embodiments, the values in the matrix 750 are stored as 16.16 fixed-point values, except for u, v and w, which are stored as 2.30 fixed-point values.

In some embodiments, the coordinates {p, q} are on the decompressed frame, and {p', q'} are at the rendering output. Therefore, for example, the matrix {2,0,0, 0,2,0, 0,0,1} doubles the pixel dimension of an image. The co-ordinates transformed by the matrix may not be normalized in any way, and can represent actual sample locations. Therefore {x, y} can, for example, be considered a translation vector for the image.

In some embodiments, the co-ordinate origin is located at the upper left corner, and increases to the right by X values, and increases downwards Y values. {p, q} and {p', q' } are typically to be taken as absolute pixel locations relative to the upper left hand corner of the original image (e.g., after scaling to the size determined by the track header's width and height) and the transformed (e.g., rendering) surface, respectively. Each track can be composed using its matrix as specified into an overall image. The composed track can then be transformed and composed according to the matrix at the movie level in the MovieHeaderBox. It can be application-dependent whether the resulting image is 'clipped' to eliminate pixels, which have no display, to a vertical rectangular region within a window, for example. For example, if only one video track is displayed and it has a translation to {20, 30}, and a unity matrix is in the MovieHeaderBox, an application may choose not to display the empty "L" shaped region between the image and the origin.

The fields width 740 and height 742 can be fixed values, such as fixed-point 16.16 values. These fields can specify the track's visual presentation size. These need not be the same as the pixel dimensions of the images, e.g., which is documented in the sample description(s). The images in the sequence can be scaled to a size based on the width and height, such as before any overall transformation of the track represented by the matrix. Therefore, the pixel dimensions of the images can act as the default values.

Figure 8:
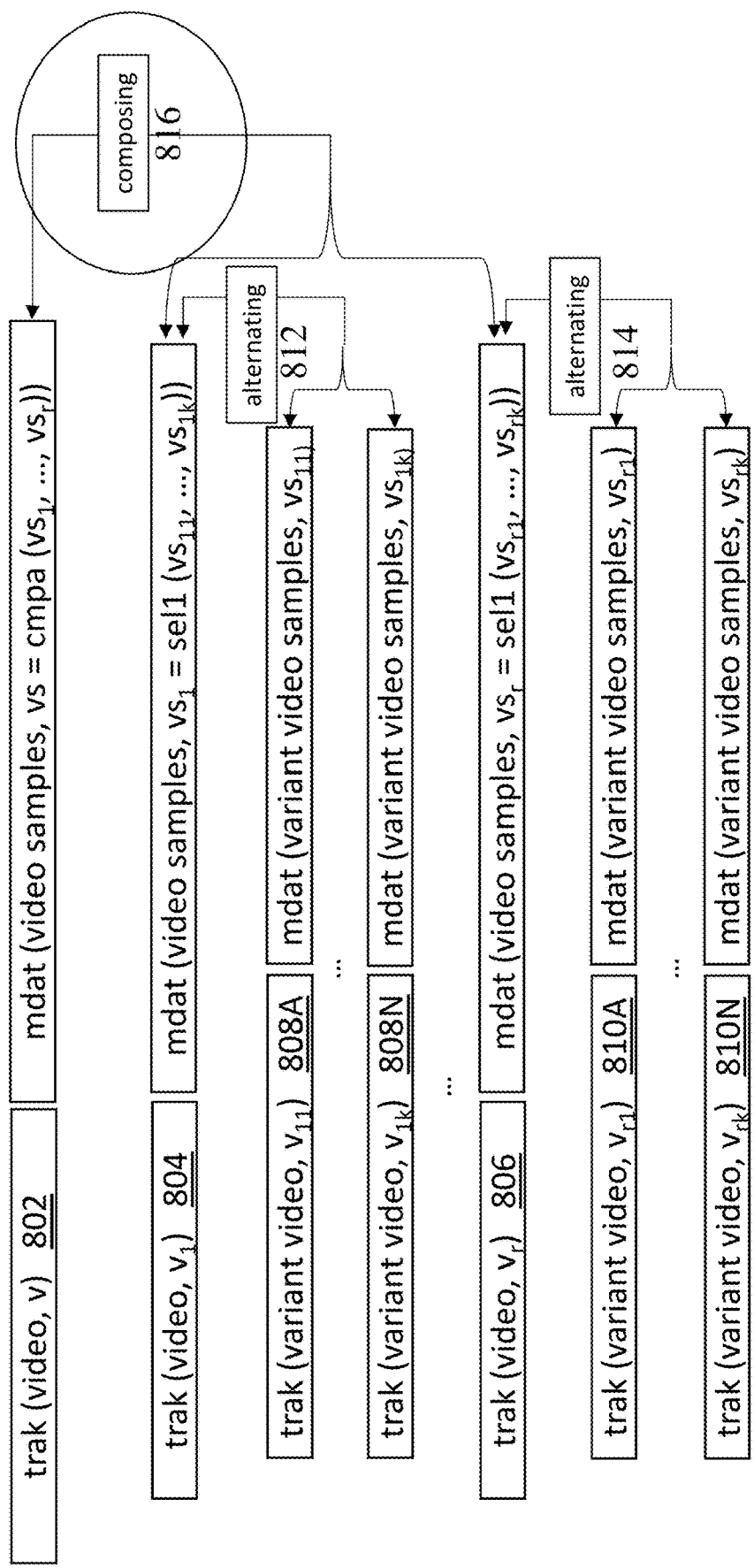
FIG. 8 shows an exemplary composite track for a set of different sub-picture and quality tracks, according to some embodiments.

FIG. 8 shows an exemplary composite track v 802 for r sub-picture and k-quality tracks, according to some embodiments. The track v 402 is composed from other tile or sub-picture tracks $v_1$ 804 through $v_r$ 806. Thus, the tile/sub-picture tracks 804-806 are the actual tracks in the file format that carry the bits. In this example, a track derivation called "alternating" 812, 814 is used to select a desired quality sub-picture from the included qualities (e.g., qualities 808A-808N for track 804, and 810A-810N for track 806) as a representative of that sub-picture. The alternating process is performed for each of the tile/sub-picture tracks with different quantities, resulting in an m×n sub-picture grid and m×n tracks, where r=m×n.

Then the selected tracks are pulled into the composite track 802, which represents the full picture. When performing the composition 816, the processing can leverage the techniques discussed herein to process the background and to perform blending. Therefore, the composite track 802 can be created using a composition operation with background and blending information, as discussed herein (e.g., the compositions discussed in conjunction with FIGS. 5-7B). If, for example, a device needs to access some portion of the content from the full picture, the composite track 802 can be accessed and drilled down into, in order to look at the derived tracks, including drilling down into the selected tracks to obtain the correct quality.

Referring back to FIG. 3, for example, each track 302 has two qualities/encryptions as shown by 304A-304D. When performing the composition, the device can select one quality and/or encryption for each track to create the composite track. In some examples, the device can pull all four selections together to get the entire picture for the composite track (e.g., for composition track C 308). Or if the device only needs some viewport region, the device can selectively pick a subset of the sub-pictures to form a smaller composite track r 310. The composition operation can additionally leverage the background and/or blending information associated with the operation to handle any gaps and/or overlays.

Figure 9:
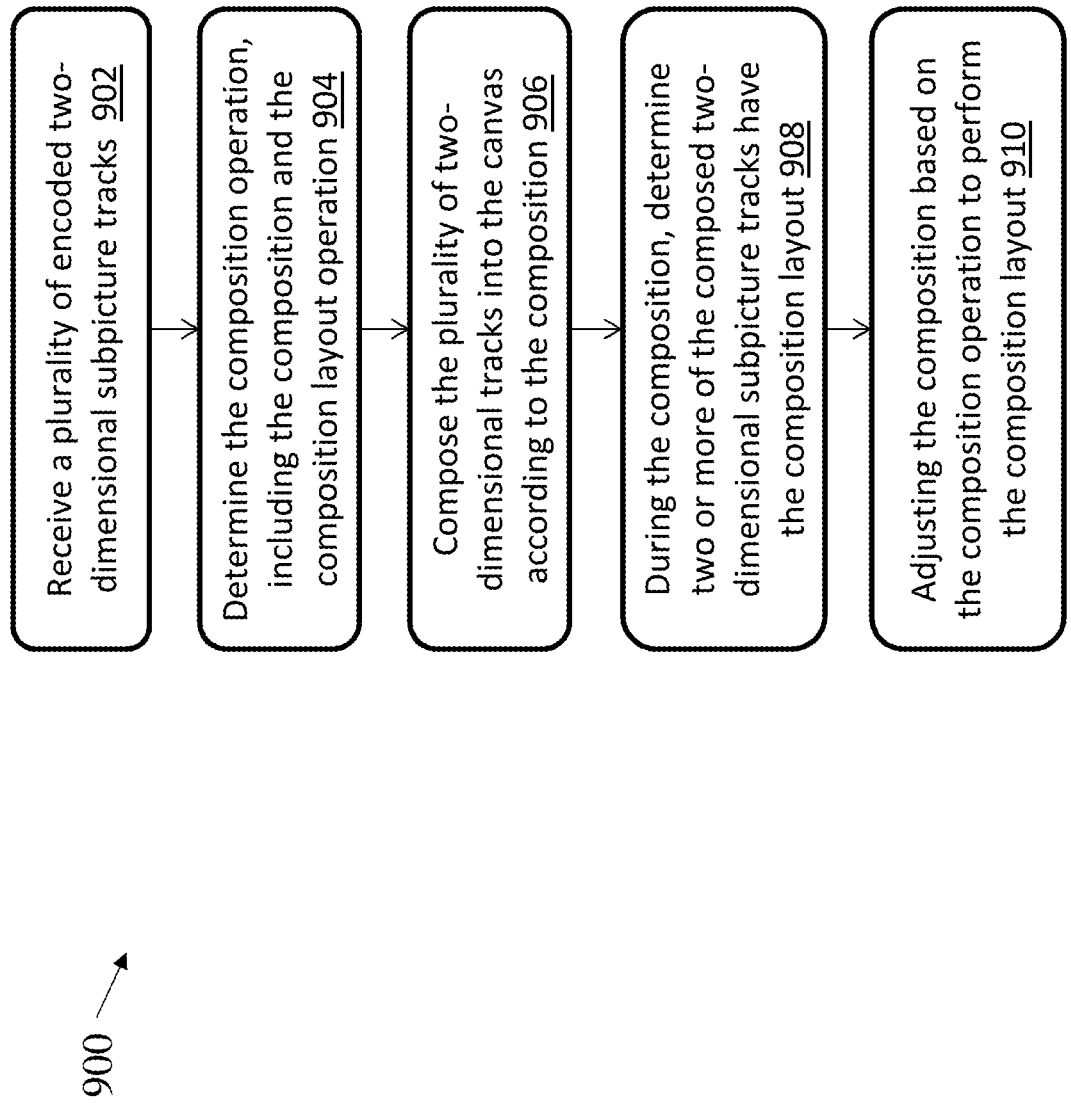
FIG. 9 shows an exemplary computerized method for composing a plurality of sub-picture tracks, according to some embodiments.

FIG. 9 shows an exemplary method 900 for composing a plurality of sub-picture tracks, according to some embodiments. At step 902, the device (e.g., decoding device 110 in FIG. 1) receives a plurality of encoded two-dimensional sub-picture tracks associated with a viewport. At step 904, the device determines a composition operation to use to compose the plurality of two-dimensional sub-picture tracks for the viewport. As discussed herein, in some embodiments the composition operation comprises a composition (e.g., a track overlay composition, a track grid composition and/or a transformation matrix composition) to perform on the plurality of two-dimensional sub-picture tracks to compose the plurality of two-dimensional tracks into a canvas. The composition operation also includes a composition layout operation (e.g., background and/or blending information) to adjust the composition if the canvas comprises a certain composition layout, such as a layout with gaps and/or overlays. At step 906, the device composes the plurality of two-dimensional tracks into the canvas according to the composition. At step 908, during the composition, the device determines two or more of the composed two-dimensional sub-picture tracks comprise the composition layout. At step 910, the device adjusting the composition based on the composition layout operation to compensate for the composition layout.

As discussed herein, the composition layout operation can include determining how to handle a composition layout, such as how to fill a gap. For example, the composition information may include a flag that is used to determine whether to fill the gap with a constant color, whether to use an image for the background, or whether to use video track content as the background. As also discussed herein, the composition layout operation can include a flag used to determine whether to perform blending. If blending is to be performed, the composition information can include parameters to specify how to perform the blending.

As discussed herein, the techniques can also include encoding the composition information. A device (e.g., the encoding device 104) encodes three-dimensional video data, including encoding a plurality of two-dimensional sub-picture tracks associated with a viewport (e.g., as discussed in conjunction with FIG. 2). The device can encode a composition operation for composing the plurality of two-dimensional sub-picture tracks for the viewport. The composition operation can include data indicative of a composition to perform on the plurality of two-dimensional sub-picture tracks to compose the plurality of two-dimensional tracks into a canvas associated with the viewport, and a composition layout operation to adjust the composition if the canvas comprises a composition layout (e.g., a layout with or without a gap and/or overlap) created by two or more of the plurality of two-dimensional sub-picture tracks composed on the canvas. The device can provide the encoded three-dimensional video data and the composition operation, such that the encoded three-dimensional video data and the composition operation can be received by a receiving device (for example, through wired or wireless connection or through any computer readable storage medium).

Techniques operating according to the principles described herein may be implemented in any suitable manner. The processing and decision blocks of the flow charts above represent steps and acts that may be included in algorithms that carry out these various processes. Algorithms derived from these processes may be implemented as software integrated with and directing the operation of one or more single- or multi-purpose processors, may be implemented as functionally-equivalent circuits such as a Digital Signal Processing (DSP) circuit or an Application-Specific Integrated Circuit (ASIC), or may be implemented in any other suitable manner. It should be appreciated that the flow charts included herein do not depict the syntax or operation of any particular circuit or of any particular programming language or type of programming language. Rather, the flow charts illustrate the functional information one skilled in the art may use to fabricate circuits or to implement computer software algorithms to perform the processing of a particular apparatus carrying out the types of techniques described herein. It should also be appreciated that, unless otherwise indicated herein, the particular sequence of steps and/or acts described in each flow chart is merely illustrative of the algorithms that may be implemented and can be varied in implementations and embodiments of the principles described herein.

Accordingly, in some embodiments, the techniques described herein may be embodied in computer-executable instructions implemented as software, including as application software, system software, firmware, middleware, embedded code, or any other suitable type of computer code. Such computer-executable instructions may be written using any of a number of suitable programming languages and/or programming or scripting tools, and also may be compiled as executable machine language code or intermediate code that is executed on a framework or virtual machine.

When techniques described herein are embodied as computer-executable instructions, these computer-executable instructions may be implemented in any suitable manner, including as a number of functional facilities, each providing one or more operations to complete execution of algorithms operating according to these techniques. A "functional facility," however instantiated, is a structural component of a computer system that, when integrated with and executed by one or more computers, causes the one or more computers to perform a specific operational role. A functional facility may be a portion of or an entire software element. For example, a functional facility may be implemented as a function of a process, or as a discrete process, or as any other suitable unit of processing. If techniques described herein are implemented as multiple functional facilities, each functional facility may be implemented in its own way; all need not be implemented the same way. Additionally, these functional facilities may be executed in parallel and/or serially, as appropriate, and may pass information between one another using a shared memory on the computer(s) on which they are executing, using a message passing protocol, or in any other suitable way.

Generally, functional facilities include routines, programs, objects, components, data structures, etc. that perform particular tasks or implement particular abstract data types. Typically, the functionality of the functional facilities may be combined or distributed as desired in the systems in which they operate. In some implementations, one or more functional facilities carrying out techniques herein may together form a complete software package. These functional facilities may, in alternative embodiments, be adapted to interact with other, unrelated functional facilities and/or processes, to implement a software program application.

Some exemplary functional facilities have been described herein for carrying out one or more tasks. It should be appreciated, though, that the functional facilities and division of tasks described is merely illustrative of the type of functional facilities that may implement the exemplary techniques described herein, and that embodiments are not limited to being implemented in any specific number, division, or type of functional facilities. In some implementations, all functionality may be implemented in a single functional facility. It should also be appreciated that, in some implementations, some of the functional facilities described herein may be implemented together with or separately from others (i.e., as a single unit or separate units), or some of these functional facilities may not be implemented.

Computer-executable instructions implementing the techniques described herein (when implemented as one or more functional facilities or in any other manner) may, in some embodiments, be encoded on one or more computer-readable media to provide functionality to the media. Computer-readable media include magnetic media such as a hard disk drive, optical media such as a Compact Disk (CD) or a Digital Versatile Disk (DVD), a persistent or non-persistent solid-state memory (e.g., Flash memory, Magnetic RAM, etc.), or any other suitable storage media. Such a computer-readable medium may be implemented in any suitable manner. As used herein, "computer-readable media" (also called "computer-readable storage media") refers to tangible storage media. Tangible storage media are non-transitory and have at least one physical, structural component. In a "computer-readable medium," as used herein, at least one physical, structural component has at least one physical property that may be altered in some way during a process of creating the medium with embedded information, a process of recording information thereon, or any other process of encoding the medium with information. For example, a magnetization state of a portion of a physical structure of a computer-readable medium may be altered during a recording process.

Further, some techniques described above comprise acts of storing information (e.g., data and/or instructions) in certain ways for use by these techniques. In some implementations of these techniques—such as implementations where the techniques are implemented as computer-executable instructions—the information may be encoded on a computer-readable storage media. Where specific structures are described herein as advantageous formats in which to store this information, these structures may be used to impart a physical organization of the information when encoded on the storage medium. These advantageous structures may then provide functionality to the storage medium by affecting operations of one or more processors interacting with the information; for example, by increasing the efficiency of computer operations performed by the processor(s).

In some, but not all, implementations in which the techniques may be embodied as computer-executable instructions, these instructions may be executed on one or more suitable computing device(s) operating in any suitable computer system, or one or more computing devices (or one or more processors of one or more computing devices) may be programmed to execute the computer-executable instructions. A computing device or processor may be programmed to execute instructions when the instructions are stored in a manner accessible to the computing device or processor, such as in a data store (e.g., an on-chip cache or instruction register, a computer-readable storage medium accessible via a bus, a computer-readable storage medium accessible via one or more networks and accessible by the device/processor, etc.). Functional facilities comprising these computer-executable instructions may be integrated with and direct the operation of a single multi-purpose programmable digital computing device, a coordinated system of two or more multi-purpose computing device sharing processing power and jointly carrying out the techniques described herein, a single computing device or coordinated system of computing device (co-located or geographically distributed) dedicated to executing the techniques described herein, one or more Field-Programmable Gate Arrays (FPGAs) for carrying out the techniques described herein, or any other suitable system.

A computing device may comprise at least one processor, a network adapter, and computer-readable storage media. A computing device may be, for example, a desktop or laptop personal computer, a personal digital assistant (PDA), a smart mobile phone, a server, or any other suitable computing device. A network adapter may be any suitable hardware and/or software to enable the computing device to communicate wired and/or wirelessly with any other suitable computing device over any suitable computing network. The computing network may include wireless access points, switches, routers, gateways, and/or other networking equipment as well as any suitable wired and/or wireless communication medium or media for exchanging data between two or more computers, including the Internet. Computer-readable media may be adapted to store data to be processed and/or instructions to be executed by processor. The processor enables processing of data and execution of instructions. The data and instructions may be stored on the computer-readable storage media.

A computing device may additionally have one or more components and peripherals, including input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

Embodiments have been described where the techniques are implemented in circuitry and/or computer-executable instructions. It should be appreciated that some embodiments may be in the form of a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The word "exemplary" is used herein to mean serving as an example, instance, or illustration. Any embodiment, implementation, process, feature, etc. described herein as exemplary should therefore be understood to be an illustrative example and should not be understood to be a preferred or advantageous example unless otherwise indicated.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the principles described herein. Accordingly, the foregoing description and drawings are by way of example only.

What is claimed is:

1. An encoding method for encoding a composition operation for a plurality of two-dimensional sub-picture tracks, the method comprising:
   encoding video data in a hierarchical track structure, comprising:
      receiving the video data including the plurality of two-dimensional sub-picture tracks associated with a viewport, wherein the plurality of two-dimensional sub-picture tracks are at a first level of the hierarchical track structure; and
      encoding a composition operation for composing the plurality of two-dimensional sub-picture tracks for the viewport, wherein the composition operation is associated with a composite track at a second level in the hierarchical track structure that is above the first level of the plurality of two-dimensional sub-picture tracks, and comprises data indicative of:
         a composition to perform on the plurality of two-dimensional sub-picture tracks to compose the plurality of two-dimensional sub-picture tracks into a canvas associated with the viewport, wherein the canvas comprises a plurality of portions and each of the plurality of two-dimensional sub-picture tracks comprises video data for at least an associated portion of the plurality of portions; and
         a composition layout operation to adjust the composition if the canvas comprises a composition layout created by two or more of the plurality of two-dimensional sub-picture tracks composed on the canvas; and
   providing the received video data and the encoded composition operation.

2. The encoding method of claim 1, wherein the composition layout comprises a gap between the two or more of the plurality of two-dimensional sub-picture tracks composed on the canvas, an overlap of the two or more of the plurality of two-dimensional sub-picture tracks composed on the canvas, or both.

3. The encoding method of claim 1, wherein encoding the composition layout operation of the composition operation comprises encoding one or more of a background color, a background image, or a background video to use to fill a gap between the two or more of the plurality of two-dimensional sub-picture tracks composed on the canvas.

4. The encoding method of claim 1, wherein encoding the composition layout operation of the composition operation comprises encoding blending data to use to blend an overlap of the two or more of the plurality of two-dimensional sub-picture tracks composed on the canvas.

5. The encoding method of claim 1, wherein encoding the composition of the composition operation comprises selecting the composition from the group consisting of:
 a track overlay composition specifying an overlay operation and an order for overlaying each of the plurality of two-dimensional sub-picture tracks on the canvas;
 a track grid composition specifying a grid order for overlaying each of the plurality of two-dimensional sub-picture tracks on the canvas; and
 a track matrix composition specifying an order and a matrix used to overlay each of the plurality of two-dimensional sub-picture tracks on the canvas.

6. A decoding method for decoding video data, the method comprising:
 receiving:
  (a) video data including a plurality of two-dimensional sub-picture tracks associated with a viewport, wherein the plurality of two-dimensional sub-picture tracks are at a first level of a hierarchical track structure; and
  (b) a composition operation to compose the plurality of two-dimensional sub-picture tracks for the viewport, wherein the composition operation is associated with a composite track at a second level in the hierarchical track structure that is above the first level of the plurality of two-dimensional sub-picture tracks, and comprises data indicative of:
   a composition to perform on the plurality of two-dimensional sub-picture tracks to compose the plurality of two-dimensional sub-picture tracks into a canvas associated with the viewport, wherein the canvas comprises a plurality of portions and each of the plurality of two-dimensional sub-picture tracks comprises video data for at least an associated portion of the plurality of portions; and
   a composition layout operation to adjust the composition if the canvas comprises a composition layout created by two or more of the plurality of two-dimensional sub-picture tracks composed on the canvas; and
 composing the plurality of two-dimensional sub-picture tracks into the canvas according to the composition, comprising:
  determining two or more of the composed two-dimensional sub-picture tracks comprise the composition layout; and
  adjusting the composition based on the composition layout operation to compensate for the composition layout.

7. The decoding method of claim 6, wherein the composition layout comprises a gap between the two or more of the plurality of two-dimensional sub-picture tracks composed on the canvas, an overlap of the two or more of the plurality of two-dimensional sub-picture tracks composed on the canvas, or both.

8. The decoding method of claim 6, wherein decoding the composition layout operation of the composition operation comprises:
 decoding one or more of a background color, a background image, or a background video; and
 composing the plurality of two-dimensional sub-picture tracks comprises filling a gap between the two or more of the plurality of two-dimensional sub-picture tracks composed on the canvas.

9. The decoding method of claim 6, wherein decoding the composition layout operation of the composition operation comprises:
 decoding blending data; and
 composing the plurality of two-dimensional sub-picture tracks comprises blending an overlap of the two or more of the plurality of two-dimensional sub-picture tracks composed on the canvas.

10. The decoding method of claim 6, wherein decoding the composition of the composition operation comprises decoding the composition from the group consisting of:
 a track overlay composition specifying an overlay operation and an order for overlaying each of the plurality of two-dimensional sub-picture tracks on the canvas;
 a track grid composition specifying a grid order for overlaying each of the plurality of two-dimensional sub-picture tracks on the canvas; and
 a track matrix composition specifying an order and a matrix used to overlay each of the plurality of two-dimensional sub-picture tracks on the canvas.

11. An apparatus configured to decode video data, the apparatus comprising a processor in communication with memory, the processor being configured to execute instructions stored in the memory that cause the processor to:
 receive:
  (a) video data including a plurality of two-dimensional sub-picture tracks associated with a viewport, wherein the plurality of two-dimensional sub-picture tracks are at a first level of a hierarchical track structure; and
  (b) a composition operation to compose the plurality of two-dimensional sub-picture tracks for the viewport, wherein the composition operation is associated with a composite track at a second level in the hierarchical track structure that is above the first level of the plurality of two-dimensional sub-picture tracks, and comprises data indicative of:
   a composition to perform on the plurality of two-dimensional sub-picture tracks to compose the plurality of two-dimensional sub-picture tracks into a canvas associated with the viewport, wherein the canvas comprises a plurality of portions and each of the plurality of two-dimensional sub-picture tracks comprises video data for at least an associated portion of the plurality of portions; and
   a composition layout operation to adjust the composition if the canvas comprises a composition layout created by two or more of the plurality of two-dimensional sub-picture tracks composed on the canvas; and
 compose the plurality of two-dimensional sub-picture tracks into the canvas according to the composition, comprising:

determining two or more of the composed two-dimensional sub-picture tracks comprise the composition layout; and adjusting the composition based on the composition layout operation to compensate for the composition layout.

12. The apparatus of claim 11, wherein the composition layout comprises a gap between the two or more of the plurality of two-dimensional sub-picture tracks composed on the canvas, an overlap of the two or more of the plurality of two-dimensional sub-picture tracks composed on the canvas, or both.

13. The apparatus of claim 11, wherein decoding the composition layout operation of the composition operation comprises:
  decoding one or more of a background color, a background image, or a background video; and
  composing the plurality of two-dimensional sub-picture tracks comprises filling a gap between the two or more of the plurality of two-dimensional sub-picture tracks composed on the canvas.

14. The apparatus of claim 11, wherein decoding the composition layout operation of the composition operation comprises:
  decoding blending data; and
  composing the plurality of two-dimensional sub-picture tracks comprises blending an overlap of the two or more of the plurality of two-dimensional sub-picture tracks composed on the canvas.

15. The apparatus of claim 11, wherein decoding the composition of the composition operation comprises decoding the composition from the group consisting of:
  a track overlay composition specifying an overlay operation and an order for overlaying each of the plurality of two-dimensional sub-picture tracks on the canvas;
  a track grid composition specifying a grid order for overlaying each of the plurality of two-dimensional sub-picture tracks on the canvas; and
  a track matrix composition specifying an order and a matrix used to overlay each of the plurality of two-dimensional sub-picture tracks on the canvas.

16. An apparatus for encoding video data, the apparatus comprising a processor in communication with memory, the processor being configured to execute instructions stored in the memory that cause the processor to:
  encode video data in a hierarchical track structure, comprising:
    receiving the video data including a plurality of two-dimensional sub-picture tracks associated with a viewport, wherein the plurality of two-dimensional sub-picture tracks are at a first level of the hierarchical track structure; and
    encoding a composition operation for composing the plurality of two-dimensional sub-picture tracks for the viewport, wherein the composition operation is associated with a composite track at a second level in the hierarchical track structure that is above the first level of the plurality of two-dimensional sub-picture tracks, and comprises data indicative of:
      a composition to perform on the plurality of two-dimensional sub-picture tracks to compose the plurality of two-dimensional sub-picture tracks into a canvas associated with the viewport, wherein the canvas comprises a plurality of portions and each of the plurality of two-dimensional sub-picture tracks comprises video data for at least an associated portion of the plurality of portions; and
      a composition layout operation to adjust the composition if the canvas comprises a composition layout created by two or more of the plurality of two-dimensional sub-picture tracks composed on the canvas; and
  provide the received video data and the encoded composition operation.

17. The apparatus of claim 16, wherein the composition layout comprises a gap between the two or more of the plurality of two-dimensional sub-picture tracks composed on the canvas, an overlap of the two or more of the plurality of two-dimensional sub-picture tracks composed on the canvas, or both.

18. The apparatus of claim 16, wherein encoding the composition layout operation of the composition operation comprises encoding one or more of a background color, a background image, or a background video to use to fill a gap between the two or more of the plurality of two-dimensional sub-picture tracks composed on the canvas.

19. The apparatus of claim 16, wherein encoding the composition layout operation of the composition operation comprises encoding blending data to use to blend an overlap of the two or more of the plurality of two-dimensional sub-picture tracks composed on the canvas.

20. The apparatus of claim 16, wherein encoding the composition of the composition operation comprises selecting the composition from the group consisting of:
  a track overlay composition specifying an overlay operation and an order for overlaying each of the plurality of two-dimensional sub-picture tracks on the canvas;
  a track grid composition specifying a grid order for overlaying each of the plurality of two-dimensional sub-picture tracks on the canvas; and
  a track matrix composition specifying an order and a matrix used to overlay each of the plurality of two-dimensional sub-picture tracks on the canvas.

* * * * *